Sept. 1, 1959
M. C. FERRE
2,902,603
THERMALLY INSULATED SCINTILLATION COUNTER
Filed June 8, 1953
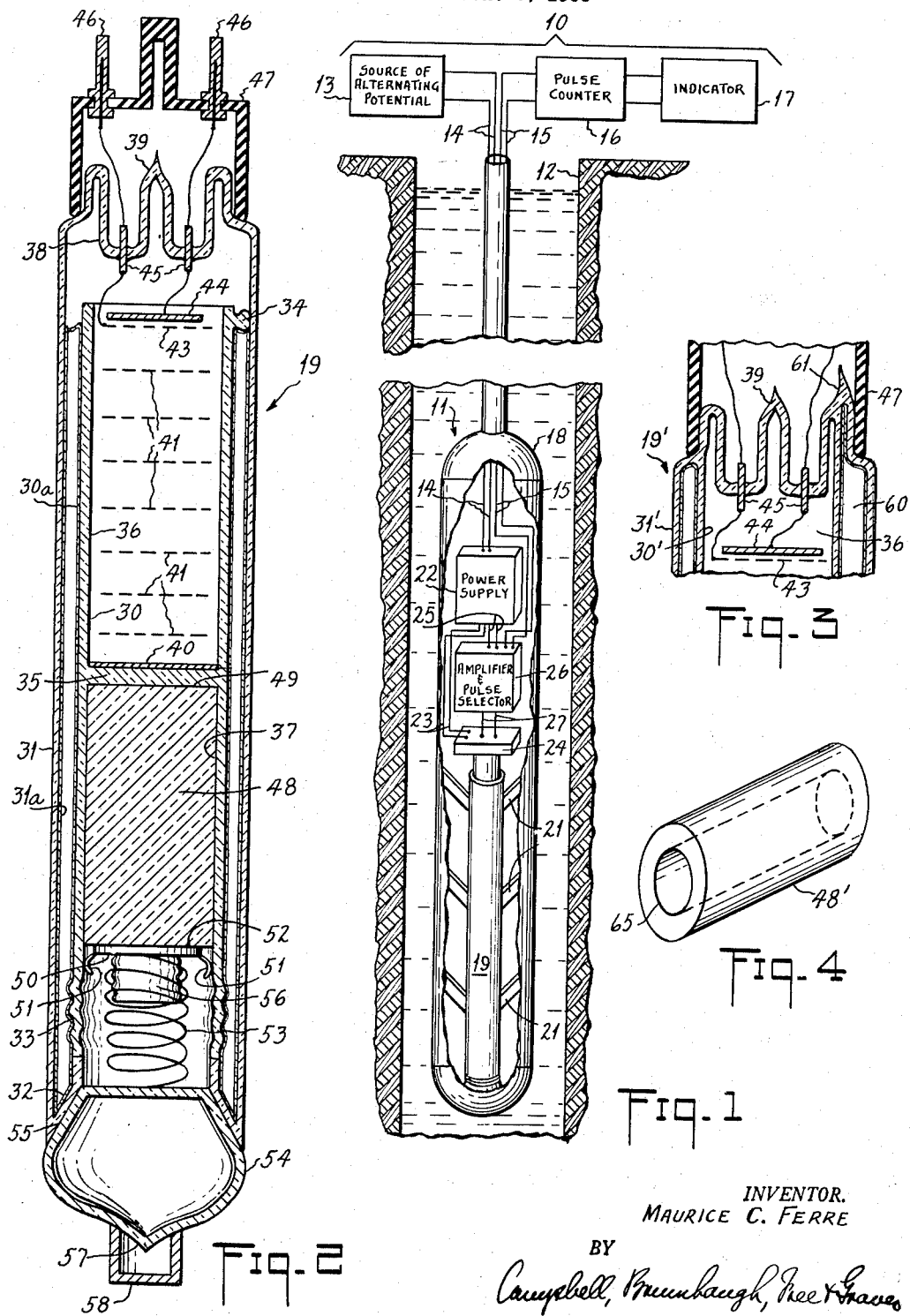
INVENTOR.
MAURICE C. FERRE
BY
*Campbell, Brumbaugh, Free & Graves*
ATTORNEYS

United States Patent Office 2,902,603
Patented Sept. 1, 1959

2,902,603

THERMALLY INSULATED SCINTILLATION COUNTER

Maurice C. Ferre, Ridgefield, Conn., assignor, by mesne assignments, to Schlumberger Well Surveying Corporation, Houston, Tex., a corporation of Texas Application June 8, 1953, Serial No. 360,305

8 Claims. (Cl. 250—71)

This invention relates to well surveying apparatus and, more particularly, pertains to an improved radiation detector of the scintillation type adapted to be employed for obtaining indications of radiation emitted by, induced in, or scattered by the formations traversed by a borehole.

It has been proposed to employ a radiation detector of the scintillation type for logging radiation emanating either naturally, or under induced conditions, from the formations traversed by a borehole. This detector includes a scintillation element for translating incident radiation into light energy and photoelectric means for deriving electrical energy from the light energy.

In order to obtain a desired high sensitivity in the detector, the photoelectric means preferably is an electron multiplier photo tube. This device comprises a photocathode followed by a series of dynodes and by applying suitable operating potentials to the various elements, instantaneous output currents of the order of a million times as great as the current leaving the photocathode may be produced. The gain of the multiplier structure may, of course, be chosen smaller, according to the requirements of the particular application, such as is the case if the noise figure of the electronic amplifier to which the output electrode of the photomultiplier is connected is sufficiently small.

A high sensitivity to incident radiation makes the scintillation detector very attractive for use in radioactivity well logging. However, presently available detectors of this type may not provide accurate measurements in a well logging application because the photomultiplier is sensitive to ambient temperature. That is, a photomultiplier inherently produces output pulses in the absence of incident light. These pulses, usually referred to as "dark current," occur randomly, but their average rate increases with temperature. Consequently, for a given incident light flux, the average number of output pulses per unit-time varies with temperature. Since the temperature in a borehole increases with depth, it is evident that the accuracy of quantitative radioactivity measurements derived through the use of a conventional scintillation-type detector may be adversely affected.

Moreover, the scintillation materials generally employed are also sensitive to heat. For instance, one scintillation material produces light pulses that increase in duration but decrease in amplitude with increasing temperature for incident radiation of fixed energy and intensity. This, of course, prevents accurate measurements of the intensity of the incident radiation.

It is, therefore, an object of the present invention to provide an improved scintillation-type radiation detector that is not subject to the above-stated deficiency of prior art devices.

Another object of the present invention is to provide an improved scintillation-type radiation detector that is not adversely affected by temperature variations attendant with its use in well logging.

Another object of the present invention is to provide an improved scintillation-type radiation detector that is of a size compatible with the space limitations of a logging instrument adapted to traverse a borehole.

In brief, the well logging apparatus in accordance with the present invention comprises a double-walled container defining an envelope interiorly of the inner wall. An essentially light-transparent partition divides the envelope into first and second compartments, the first of which is sealed and thereby maintained at a given gas pressure, preferably a vacuum. The first compartment encloses a plurality of electrodes included in an electron multiplying array that receives derived electrons from a photocathode carried by the partition. A scintillation element is positioned in the second compartment with a least a portion thereof in light-transmitting relation with the photocathode so that light energy produced in response to incident radiation excites the photocathode. At least one surface of each wall of the aforesaid container is essentially opaque to heat energy and the space between the walls is evacuated and sealed, thereby thermally insulating the compartments from the exterior surface of the outer one of the container walls.

The features of the present invention, which are believed to be novel are set forth with particularity in the appended claims. The present invention, both as to its organization and manner of operation, together with further objects and advantages thereof, may best be understood by reference to the following description taken in connection with the accompanying drawing in which:

Fig. 1 is a perspective view, partly in block form, of well logging apparatus shown in association with a borehole and featuring a radiation detector embodying the present invention a portion of the equipment in the borehole being shown cut-away to reveal interior details thereof;

Fig. 2 is a sectional view taken in the plane of the sheet including Fig. 1 and drawn to an enlarged scale;

Fig. 3 is a fragmentary view similar to that represented in Fig. 2, but illustrating a modified form of the device; and Fig. 4 is a perspective view of a modification of a portion of the device shown in Fig. 2.

In Fig. 1 of the drawing, there is shown well logging apparatus including surface equipment 10 and a device 11 disposed in a borehole 12 that may or may not be filled with a drilling fluid. Surface equipment 10 includes a source of alternating potential 13 electrically connected to borehole device 11 by a pair of supply conductors 14 to provide power for energizing apparatus included in device 11.

As will be later described, apparatus in device 11 converts radiations emanated by the formations adjacent device 11 into electrical pulses and these pulses are supplied over a pair of output conductors 15 to a pulse counter 16, in turn, coupled to an indicator 17, such as a recording meter.

Cable conductors 14—15, of course, are electrically insulated from one another and are preferably enclosed by a protective armour. Thus, the cable may be used to lower and raise device 11 in borehole 12 whereby a curve, representing number of counts per unit time or any other useful data pertinent to intensity of a given type of radiation versus depth, may be recorded in indicator 17. For example, gamma radiation may be recorded. Moreover, whether gamma or another type, the recorded radiation may be either naturally occurring or be artificially induced to emanate from formations by exposure of the same to a suitable source of neutrons, gamma rays, or ultraviolet rays positioned to travel with device 11 into the borehole whereby other informative logs may be obtained in a well-known manner.

In order to withstand the extremely high pressures that may be encountered by device 11 in traversing a borehole filled with drilling fluid, a pressure-tight housing 18, preferably of steel provided with appropriate windows transparent to the desired radiation, encloses the several elements of the borehole equipment. Of course, in those applications where the housing itself is sufficiently transparent to the radiation to be detected, as may be the case for gamma rays, a window is not needed.

These elements comprise a radiation detector 19, suitably supported at the lower end of device 11 by an end shock mounting 20 and a series of lateral shock mountings 21. These mountings preferably are, at least in part, sufficiently resilient to prevent damage to detector 19 when device 11 is subjected to impact.

As will be later explained in connection with Fig. 2, detector 19 is of the scintillation type including a scintillation element and a photomultiplier. The photomultiplier requires certain operating potentials, generally of high value. These are derived from a conventional, regulated power supply 22 which converts the alternating potential available at leads 14 into the required unidirectional, high potential. The latter potential is supplied over leads 23 to a chassis 24 into which the detector 19 is plugged and which contains a suitable bleeder arrangement (not shown) whereby the various potentials for the dynodes of the photomultiplier are derived.

Power supply 22 also supplies unidirectional operating potential of suitable magnitude over leads 25 to an amplifier and pulse selector unit 26 connected via leads 27 to the output circuit (not shown) of the photomultiplier portion of detector 19. Unit 26 may be of any well-known construction serving to amplify the output of the photomultiplier and to exclude a portion of the extraneous "dark current" pulses usually present in the output of a photomultiplier. For example, unit 26 may include an amplitude selector coupled to a pulse-forming circuit.

The details of the circuit just described are generally well-known and form no part of the present invention. Hence, a further description thereof is deemed unnecessary.

The constructional details of detector 19 may best be seen in the cross-sectional view of Fig. 2. It comprises a container provided with inner and outer tubular, glass walls 30 and 31 disposed in coaxial relationship. The lower extremity of tubular wall 30 is connected to wall 31 by an annular frustoconical junction 32 and adjacent that extremity, wall 30 is provided with an annular portion 33 of scalloped or corrugated cross-section. This relieves the ridigity of the connection between cylinders 30 and 31 and prevents fractures which might otherwise occur due to non-uniform changes in the cylinders with temperature variations.

To limit movement between the upper extremities of the cylinders, inner cylinder 30 includes a plurality of integral, glass projections or spacers 34 distributed uniformly about its outer periphery. Although but two spacers 34 have been illustrated, a suitable number are employed to center cylinder 30 within cylinder 31. The surfaces of the projections are machined to conform substantially to the configuration of the inner surface of tube 31. Preferably, by means of a cushion or pad (not shown) of glass cloth interposed between adjacent surfaces of member 31 and spacers 34, a relatively rigid but non-brittle connection is made between the cylinders.

A disk-like partition 35 of flat optical glass divides the envelope defined by inner cylinder 30 into a first compartment 36 and a second compartment 37. The outer cylinder 31 extends beyond the upper end of inner cylinder 30 and terminates in a closed stem 38 provided with an exhaust port 39. Compartment 36 and the space between cylinders 30 and 31 are in communication through the interspaces between spacers 34, these interspaces acting as pressure equalizing ports. Thus, the volume including compartment 36 and the space between cylinders 30 and 31 may be evacuated and sealed and thereby maintained at a desired gas pressure. Preferably, a vacuum is provided, suitable for proper operation of a photomultiplier, such as will now be described.

A photocathode 40 is supported within compartment 36, covering essentially the entire surface area of transparent partition 35. The photocathode may be constructed of a monovalent metal, either pure or in combination with a metallic oxide, exhibiting a relatively low electron extraction function thereby providing a suitable photoelectric sensitivity.

The photocathode may, for example, be fabricated of caesium, potassium, or of compounds such as caesium and antimony, or caesium-oxygen-silver, which are among the most widely used in common practice.

Compartment 36 encloses an electron multiplier, for example, of the type comprising a plurality of screen-like secondary-electron-emitting dynode elements or electrodes 41 suitably supported in a succession along the axis of tube 30. The dynodes may be constructed of a silver-magnesium alloy or of a suitable base metal coated, for example, with a caesium-antimony compound. They may be mounted on supporting wires (not shown) imbedded in or otherwise fixed to stem 38. A screen or collector electrode 43 terminates the array of dynodes and is followed by an anode 44.

A plurality of suitable glass-to-metal seals 45 are provided for introducing electrical conductors into the evacuated envelope to connect the several electrodes 41, 43 and 44 with respective ones of a plurality of pins 46 that extend from a base member 47. These conductors may be comprised of at least one of the supporting wires (not shown) of each of the electrodes. The pins and base constitute a plug that is fixed to stem portion 38 of tube 31. Although but two electrical connections and two corresponding pins are shown, it is to be understood that each of the electrodes is connected to a respective pin so that by inserting plug 46—47 in a socket electrically associated in a suitable circuit, operating potentials may be applied to the several dynodes 41 and an output potential may be derived from the collector 43.

In order to convert incident radiation into light energy for application to the photocathode of the photomultiplier just described, compartment 37 receives a solid, generally-cylindrical scintillation element 48. For example, if gamma-rays are to be detected, it may be constructed of sodium iodide activated with thallium in essentially transparent crystalline form, conforming closely in its cylindrical dimensions to the inner cylindrical wall size of compartment 37.

One end 49 of the crystal is ground substantially flat and is in optical contact with partition 35. Compartment 37 is filled with a fluid, such as mineral oil or a silicone oil, further to improve the optical contact between end 49 of the scintillation element and partition 35. Of course, element 48 may be a scintillation material in liquid form.

A retaining plate 50, provided with centering fingers 51, engages the remaining end 52 of element 48 and a pressure spring 53 extending between the retaining plate and an end cap 54 for compartment 37 biases element 48 into engagement with partition 35. Cap 54 is hollow and is sealed to maintain a given gas pressure, preferably a desired vacuum, therein. One of its outer faces 55 is of frustro-conical configuration corresponding to that of junction 32. Abutting surfaces of junction 32 and face 55 are ground to effect a fluid-tight seal for compartment 37. The cap 54 may be held in tightly fitted relation in its seat by suitable means (not shown).

To accommodate for changes in volume of the scintillation element 48 and/or the fluid within compartment 37 due to slight temperature variations, a volume-compensating bellows 56 is fixed to plate 52 and extends, for instance, within the convolutions of spring 53. The bellows is fluid-tight and filled with a compressible gas at low pressure, such as air, or may be vacuum sealed. Thus, if the fluid compartment 37 expands, the bellows 56 is reduced in volume as the air therein is slightly compressed. Conversely, the bellows expands to adjust for reduction in volume of the fluid.

To protect the seal-off tip 57 of cap 54 against breakage, a cup-shaped member 58 receives tip 57 and is fixed in inverted position to cap 54.

The adjacent surfaces of cylindrical walls 30 and 31 are coated respectively with layers 30a and 31a of a heat and light reflecting material. Layers 30a and 31a may be composed, for example, of silver applied in a known manner.

In operation, assuming the detector 19 is connected in the circuit of Fig. 1, radiation incident on scintillation element 48, such as gamma rays, causes corresponding light energy pulses to be generated thereby. These light pulses impinge directly, and after reflection by the silver coating on wall 30, on photocathode 40. Electrons are thus liberated from the photocathode and travel to the first of dynodes 41. Thereafter, and essentially instantaneously, electron multiplication occurs via the several dynodes, in a known manner, and an output current pulse is derived at collector electrode 43. The number of output pulses, of course, is dependent upon the number of gamma rays absorbed to a selected degree by the scintillation element.

In detector 19 the pair of walls 30—31, with substantially no heat conductive gas therebetween and with their heat and light reflecting coatings, act as an effective barrier to heat conduction between the interior and exterior of the detector. Moreover, cap 54 with its evacuated hollow space furnishes an additional heat transmission barrier. Accordingly, it is evident that external temperature changes have little or no effect on the internal temperature of the detector for a given time interval. Thus, in the course of a survey of a bore-hole using the apparatus of Fig. 1, although elevated temperatures may be encountered, the interior temperature of detector 19 (and of the enclosed photomultiplier and scintillation element) remains fixed and consistently accurate measurements may be made.

In addition to the heat-insulating function performed by the coated walls 30—31, the reflecting coating on wall 30 materially increases the operating efficiency of detector 19 by collecting and directing light energy from scintillation element 48 that might otherwise be wasted. This, of course, is of great advantage in detecting low energy radiation.

Some materials, like the sodium iodide crystals employed for scintillation element 48 in gamma ray logging, are relatively hygroscopic. Consequently, the scintillation element may absorb moisture and the operating efficiency of the detector may thus be impaired.

Moreover, it may be desirable to exchange crystals in order to detect radiation of different types or energy levels.

It is evident that scintillation element 48 is readily accessible for either of these eventualities. This is accomplished simply by removing cap 54, spring 53 and plate 52.

From an inspection of Fig. 2, it may be seen that detector 19 may be very compact to meet the space limitations on borehole equipment. This is possible because the envelope of the detector itself provides thermal insulation and no heat insulating members, exclusive of the detector envelope, are necessary. By thus making use of essentially all the space within the thermally insulating envelope, maximum sensitivity and minimum size are attained.

In the modified structure of detector 19' shown in Fig. 3, portions which correspond to the identical parts of the detector 19 of Fig. 2 are represented by the same reference numerals.

Instead of the walls 30' and 31' being separated, as in Fig. 1, they are sealed together. Thus, in addition to compartments 36 and 37, there is formed a third compartment 60 between the walls 30' and 31'. Exhaust port 39 is utilized for evacuating compartment 36 and an additional exhaust port 61, disposed within base member 47, is employed to draw a vacuum in compartment 60. Since the walls 30' and 31' are joined together at the base or upper end of detector 19', it may not be necessary to use the corrugated-appearing section 33 (Fig. 2) in wall 30. If the corrugated section is omitted, it may be desirable to utilize a material for walls 30' and 31' having a temperature coefficient of expansion essentially equal to zero to prevent fractures due to unequal expansion, with temperature, in the two walls.

In a structure of the type illustrated in Fig. 3, the photomultiplier may be replaced by a suitable gaseous device and to that end, chamber 36 is filled with a gas, such as argon, at a proper pressure which may differ in avlue from that of the vacuum in compartment 60. An electrical connection is made to the photocathode and the only other necessary element is a suitably composed and oriented anode (the screens 41, 43 are not needed). The operation of this type of device is generally well understood.

In Fig. 4, there is shown a modified scintillation element 48' that may be employed in the detector 19 of Fig. 2. It is of generally cylindrical configuration, but is provided with a coaxial opening 65. The diameter of the opening may be in the neighborhood of one-half the outer diameter of the element. For example, if the diameter of the opening is 0.7 that of the element, the weight of the scintillation element is reduced by a factor of 2. This reduction effects a saving in material and also alleviates the overstressed condition of the walls of detector 19. An overstress might ordinarily exist because the crystal element usually is many times heavier than the remainder of the detector 19.

The reduction in weight by providing a coaxial opening in cylindrical scintillation element 48' does not necessarily reduce its operating efficiency by a corresponding factor. This is particularly true if the crystal is highly absorbent to incident radiation and its outer portion contributes more to the production of light pulses than would its absent center section.

In order to concentrate the light produced by scintillation element 48' at the photocathode of detector 19, opening 65 may be filled with a fluid having an index of refraction matching that of the crystal material. By suitably selecting the filling, the weight of the assembly may not be appreciably increased.

Alternatively, a comparatively light-weight scintillation liquid, such as a solution of terphenyl in m-xylene in the ratio of five grams per liter, may be employed to fill opening 65.

Although particular scintillation materials have been specified for element 48, it is to be understood that other materials may be employed. For example, the scintillation element may be constructed of naphthalene, anthracene, or calcium tungstate.

In addition, while one type of photomultiplier of a given number of dynodes has been illustrated, any of a variety of photomultipliers and any suitable number of dynodes may be employed. For example, a structure commonly referred to as the "Venetian blind" construction may be utilized. Alternatively, if suitable magnetic shielding can be provided, any variety of the so-called focussed-types of electron multiplier structures may be used.

Of course, by constructing compartment 37 of suitable length, a scintillation element of any desired length may be employed. For example, in practice a particular screen-type multiplier including 10 dynodes is used together with a crystal element approximately twice the length shown in Fig. 2.

If desired, cap 54 may be sealed in place. In this case, the photomultiplier and scintillation element are contained in an integral unit and to change either of the component parts, of course, the entire detector 19 may be easily unplugged from its socket and another properly-equipped detector plugged into place.

The embodiments of Figs. 2 and 3 operate most efficiently to thermally insulate the interior of the detector from external temperature variations under conditions where the gas in the space between walls 30, 31 (Fig. 2) or walls 30', 31' (Fig. 3) is maintained under high vacuum conditions. It will be appreciated, however, that the space included between the two walls in a pair thereof is in the nature of a "dead space" preventing the flow of convection gas currents in the space. Thus substantial thermal insulation is provided irrespective of the gas pressure maintained in the space between adjacent walls.

It should be noted that while the embodiments disclosed employ a pair of hollow cylindrical members in coaxial relation as a part of the structure involved in creating a barrier to heat flow between the exterior and interior of the detector, other members having configurations different than cylindrical may also be suitably employed to furnish thermal insulation for the detector. It should also be noted that in the embodiments disclosed thermal insulation is provided for various types of radiation responsive means, one type being represented by the scintillation element 48 and another type being represented by the photosensitive electron discharge device contained within compartment 36.

It will be appreciated that in addition to well logging, radiation detectors of the type of construction described may be gainfully employed in any situation where the detector may be adversely affected by temperature variations or where compactness is a desirable feature.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. In combination, a first elongated cylindrical member having a hollow bore, radiation responsive means disposed within the bore of said first member, the response of said means being affected by variations in the temperature condition of said means, a second cylindrical member with a bore exceeding said first member in diameter, said second member being supported in coaxial relation with said first member to enclose a space surrounding said first member, said space furnishing a barrier to heat flow between said radiation responsive means and the exterior of said second member, port means communicating between said space and the bore of said first member to permit equalization of pressures therebetween and imperforate closure means sealing off the exterior of said second member from both said space and the bore of said first member to permit maintenance within both of the same of a pressure condition unaffected by pressure variations exterior of said second member.

2. In combination, a member having a hollow bore, a light transmitting partition dividing the bore of said member into two compartments, imperforate closure means for maintaining the interior of one of said compartments in an evacuated condition, a photosensitive cathode formed on the face of said partition bounding said one compartment, electrode means in said one compartment forming with said cathode a photosensitive electron discharge device, and radiation-sensing means disposed in the other compartment to transmit light energy through said partition to said cathode in an amount indicative of radiation sensed.

3. In combination, a hollow bore member, a light transmitting partition dividing the bore of said member into two compartments, imperforate closure means for maintaining the interior of one of said compartments in an evacuated condition, a photosensitive cathode formed on the face of said partition bounding said one compartment, electrode means in said one compartment forming with said photosensitive cathode a photosensitive electron discharge device, radiation sensing means disposed in the other compartment to transmit light energy through said partition in an amount indicative of radiation sensed, a portion of said transmitted light energy being absorbed directly by said cathode, and means for reflecting onto said photosensitive cathode light energy transmitted through said partition and falling upon a portion of the bore surface of said member bounding said one compartment.

4. In combination, a member having a hollow bore, a light transmitting partition disposed across said bore to divide the same into two compartments, imperforate closure means for maintaining one compartment in an evacuated condition, a photosensitive cathode formed on the face of said partition bounding said one compartment, a plurality of electrodes disposed in said one compartment to form a photosensitive electron discharge device, and a body of radiation responsive scintillation material disposed in said other compartment to transmit light energy emanated from said material through said partition onto said cathode.

5. In combination, a first member having a hollow bore and an outer bounding surface for said member, a light transmitting partition disposed across said bore to divide the same into two compartments, radiation-sensing means disposed in one compartment to transmit light energy through said partition as a measure of a radiation sensed, light-responsive signal-producing means disposed in the other compartment to receive light transmitted from said condition-sensing means through said partition, at least one of said radiation-sensing means and light responsive means being affected by variations in the temperature condition thereof, a second hollow member having an inner hollow bounding surface enclosing a space surrounding said first member, and imperforate closure means for maintaining said space in an evacuated condition, said evacuated space furnishing a barrier to heat flow between the temperature affected element within the bore of said first member and the exterior of said second member.

6. A combination as in claim 5 wherein said outer and inner bounding surfaces have heat reflecting characteristics.

7. In combination, a first member having a hollow bore, a light transmitting partition disposed across said bore to divide the same into two compartments, imperforate closure means for maintaining one compartment in an evacuated condition, a photosensitive cathode formed on the face of said partition bounding said one compartment, a plurality of electrodes disposed in said one compartment to form with said cathode a photosensitive electron discharge device, a body of radiation responsive scintillation material disposed in the other compartment in snug bore fitting relation and in substantially face to face contact relation with said partition to transmit light energy therethrough to said cathode, and a second hollow member enclosing within its hollow an evacuated space surrounding said first member, said evacuated space furnishing a barrier to heat flow between the exterior of said second member and the elements contained within the compartments of said first member.

8. In combination, a first light transparent member having an outer bounding surface and a hollow bore, a light transmitting partition disposed across said bore to divide the same into two compartments, imperforate closure means for maintaining one of said compartments in an evacuated condition, a photosensitive cathode formed on the face of said partition bounding said one compartment, a plurality of electrodes disposed in said one compartment to form with said cathode a photosensitive electron discharge device, a body of scintillation material disposed on the other compartment in snug bore fitting relation and in substantially face to face contact relation with said partition to transmit light energy therethrough, a second hollow member having an inner bounding surface, said second member enclosing within its hollow an evacuated space surrounding said first member, a first heat and light reflective coating on said outer bounding surface, a second heat reflective coating on said inner bounding surface, said evacuated space and said reflective coatings together furnishing a barrier to heat flow between the exterior of said second member and the elements contained in the compartments of said first member, and said first reflective coating further serving to reflect onto said cathode light energy transmitted from said scintillation material through said partition and falling on said first coating.

References Cited in the file of this patent

UNITED STATES PATENTS

| | | |
|---|---|---|
| 2,187,011 | Braden | Jan. 16, 1940 |
| 2,433,554 | Herzog | Dec. 30, 1947 |
| 2,648,012 | Scherbatskoy | Aug. 4, 1953 |
| 2,659,011 | Youmans et al. | Nov. 10, 1953 |
| 2,686,266 | Pringle et al. | Aug. 10, 1954 |
| 2,711,084 | Bergan | June 21, 1955 |
| 2,714,169 | Armistead | July 26, 1955 |
| 2,739,242 | Armistead | Mar. 20, 1956 |
| 2,750,514 | Armistead | June 12, 1956 |

OTHER REFERENCES

Two-Crystal Gamma Ray Scintillation Spectrometer, Connally, The Review of Scientific Instruments, vol. 24, No. 6, pages 458–459.

The Scintillation Counter, Coltman, Proceedings of I.R.E., June 1949 issue, pages 671–682.

Radioactivity and Nuclear Physics, Cork, published by Van Nostrand Co., Inc., New York, N. Y., second edition June 1950, pages 55–59.

Instrumentation for Radioactivity, Pieper Science, vol. 112, October 6, 1950, pages 379–280.

Optical Cement for Scintillation Use, Shipp, Rev. of Sci. Instruments, vol. 23, No. 12, December 1952.